(12) United States Patent
Herrin et al.

(10) Patent No.: US 9,411,711 B2
(45) Date of Patent: *Aug. 9, 2016

(54) ADOPTING AN EXISTING AUTOMATION SCRIPT TO A NEW FRAMEWORK

(71) Applicant: International Business Machines Corporation, Armonk, NY (US)

(72) Inventors: Bradley C. Herrin, Marina Del Rey, CA (US); Maneesh Mehra, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

This patent is subject to a terminal disclaimer.

(21) Appl. No.: 14/042,437

(22) Filed: Sep. 30, 2013

(65) Prior Publication Data

US 2015/0074646 A1    Mar. 12, 2015

Related U.S. Application Data

(63) Continuation of application No. 14/022,928, filed on Sep. 10, 2013.

(51) Int. Cl.
  *G06F 11/36* (2006.01)
  *G06F 9/44* (2006.01)

(52) U.S. Cl.
  CPC ............... *G06F 11/368* (2013.01); *G06F 8/71* (2013.01); *G06F 11/3668* (2013.01)

(58) Field of Classification Search
  None
  See application file for complete search history.

(56) References Cited

U.S. PATENT DOCUMENTS

| 7,707,562 | B1 | 4/2010 | Kaltenbach | |
|---|---|---|---|---|
| 7,802,238 | B2 | 9/2010 | Clinton | |
| 8,549,483 | B1 * | 10/2013 | Bridges, Sr. | G06F 11/3684 717/126 |
| 2005/0010919 | A1 * | 1/2005 | Ramanathan | G06F 8/61 717/174 |
| 2007/0234300 | A1 * | 10/2007 | Leake | G06F 8/51 717/124 |
| 2008/0301702 | A1 * | 12/2008 | Gibbs | G06F 8/30 719/311 |
| 2009/0217302 | A1 * | 8/2009 | Grechanik | G06F 8/70 719/320 |

(Continued)

OTHER PUBLICATIONS

Leita et al. "Scriptgen: an automated script generation tool for honeyd." Computer Security Applications Conference, 21st Annual. IEEE, 2005. Retrieved on [Mar. 18, 2016] Retrieved from the Internet: URL<http://ieeexplore.ieee.org/stamp/stamp.jsp?tp=&arnumber=1565248>.*

Grechanik et al. "Maintaining and evolving GUI-directed test scripts." Software Engineering, 2009. ICSE 2009. IEEE 31st International Conference on. IEEE, 2009. Retrieved on [Mar. 8, 2016] Retrieved from the Internet: URL<http://ieeexplore.ieee.org/stamp/stamp.jsp?tp=&arnumber=5070540>.*

*Primary Examiner* — Thuy Dao
*Assistant Examiner* — Cheneca Smith
(74) *Attorney, Agent, or Firm* — Cuenot, Forsythe & Kim, LLC

(57) ABSTRACT

Arrangements described herein relate to adopting an existing automation script to a new framework. A first version of an automation script configured to execute in a first framework, and expected unit test results for the automation script, are received. A second version of the automation script is created from the first version of the automation script. The second version of the automation script is configured to execute in at least a second framework. The first version of the automation script is executed in the first framework to run a first version of a unit test and the second version of the automation script is executed in the second framework to run a second version of the unit test. Results generated by execution of the first and second versions of the automation script are analyzed to validate the second version of the automation script.

10 Claims, 3 Drawing Sheets

(56) References Cited

U.S. PATENT DOCUMENTS

| | | | |
|---|---|---|---|
| 2011/0246967 A1* | 10/2011 | Garavaglia, Jr. | G06F 9/445 717/124 |
| 2012/0047492 A1* | 2/2012 | Huang | G06F 8/60 717/128 |
| 2012/0144373 A1* | 6/2012 | Cook | G06F 8/38 717/125 |

* cited by examiner

200

---

Receive a first version of an automation script configured to execute in a first framework and expected unit test results for the automation script
202

---

Automatically create, using a processor, a second version of the automation script from the first version of the automation script, the second version of the automation script configured to execute in at least a second framework
204

---

Automatically create a second version of a unit test from a first version of the unit test
206

---

Execute the first version of the automation script in the first framework to run the first version of the unit test and execute the second version of the automation script in the second framework to run the second version of the unit test
208

---

Compare at least a first output generated by the first version of the automation script running the first version of the unit test and at least a second output generated by the second version of the automation script running the second version of the unit test to at least one expected unit test result to determine whether the first output and the second output correlate with the expected unit test result
210

---

Capture a first state of a first system hosting the first framework post execution of the first version of the automation script and capture a second state of a second system hosting the second framework post execution of the second version of the automation script
212

---

Compare the second state of the second system to the first state of the first system to determine whether the second state correlates with the first state
214

---

Responsive to the first output and the second output correlating with the expected unit test result and the second state correlating to the first state, determine the second version of the automation script is valid and output the second version of the automated script and the second version of the unit test for deployment
216

FIG. 2

ADOPTING AN EXISTING AUTOMATION SCRIPT TO A NEW FRAMEWORK

CROSS-REFERENCE TO RELATED APPLICATIONS

This application is a continuation of application Ser. No. 14/022,928, filed on Sep. 10, 2013, which is fully incorporated herein by reference.

BACKGROUND

Arrangements disclosed herein relate to frameworks and, more particularly, to the use of automation scripts.

Software Engineers currently depend upon a large amount of automation scripts written in a particular framework. Examples of such frameworks include the IBM® Workload Deployer cloud framework, Rational® Build Forge® and Tivoli® Service Automation Manager. Still, numerous other frameworks commonly are used. Software Engineers constantly develop automation in these frameworks to support old and new systems while attempting to transition to new virtualized delivery and deployment models such as the IBM SmartCloud® Continuous Delivery. The IBM SmartCloud® Continuous Delivery model uses and promotes an execution environment that is based not only on proprietary technology, but also open-source toolkits and frameworks, that are used to drive automation in a cloud network.

BRIEF SUMMARY

Arrangements described herein relate to adopting an existing automation script to a new framework.

A method of includes receiving a first version of an automation script configured to execute in a first framework and expected unit test results for the automation script, and automatically creating, using a processor, a second version of the automation script from the first version of the automation script. The second version of the automation script is configured to execute in at least a second framework. The method also includes executing the first version of the automation script in the first framework to run a first version of a unit test and executing the second version of the automation script in the second framework to run a second version of the unit test. The method further includes comparing at least a first output generated by the first version of the automation script running the first version of the unit test and at least a second output generated by the second version of the automation script running the second version of the unit test to at least one expected unit test result to determine whether the first output and the second output correlate with the expected unit test result. Responsive at least to the first output and the second output correlating with the expected unit test result, a determination can be made that the second version of the automation script is valid.

A system includes a processor programmed to initiate executable operations. The executable operations include receiving a first version of an automation script configured to execute in a first framework and expected unit test results for the automation script, and automatically creating a second version of the automation script from the first version of the automation script. The second version of the automation script is configured to execute in at least a second framework. The executable operations also include executing the first version of the automation script in the first framework to run a first version of a unit test and executing the second version of the automation script in the second framework to run a second version of the unit test. The executable operations further include comparing at least a first output generated by the first version of the automation script running the first version of the unit test and at least a second output generated by the second version of the automation script running the second version of the unit test to at least one expected unit test result to determine whether the first output and the second output correlate with the expected unit test result. Responsive at least to the first output and the second output correlating with the expected unit test result, a determination can be made that the second version of the automation script is valid.

A computer program product includes a computer readable storage medium having program code stored thereon. The program code is executable by a processor to perform a method. The method includes receiving, by the processor, a first version of an automation script configured to execute in a first framework and expected unit test results for the automation script, and automatically creating, by the processor, a second version of the automation script from the first version of the automation script. The second version of the automation script is configured to execute in at least a second framework. The method also includes executing, by the processor, the first version of the automation script in the first framework to run a first version of a unit test and executing the second version of the automation script in the second framework to run a second version of the unit test. The method further includes comparing, by the processor, at least a first output generated by the first version of the automation script running the first version of the unit test and at least a second output generated by the second version of the automation script running the second version of the unit test to at least one expected unit test result to determine whether the first output and the second output correlate with the expected unit test result. Responsive at least to the first output and the second output correlating with the expected unit test result, a determination can be made, by the processor, that the second version of the automation script is valid.

BRIEF DESCRIPTION OF THE SEVERAL VIEWS OF THE DRAWINGS

FIG. 2 is a flow chart illustrating an example of a method of adopting an existing automation script to a new framework.

DETAILED DESCRIPTION

Figure 1:
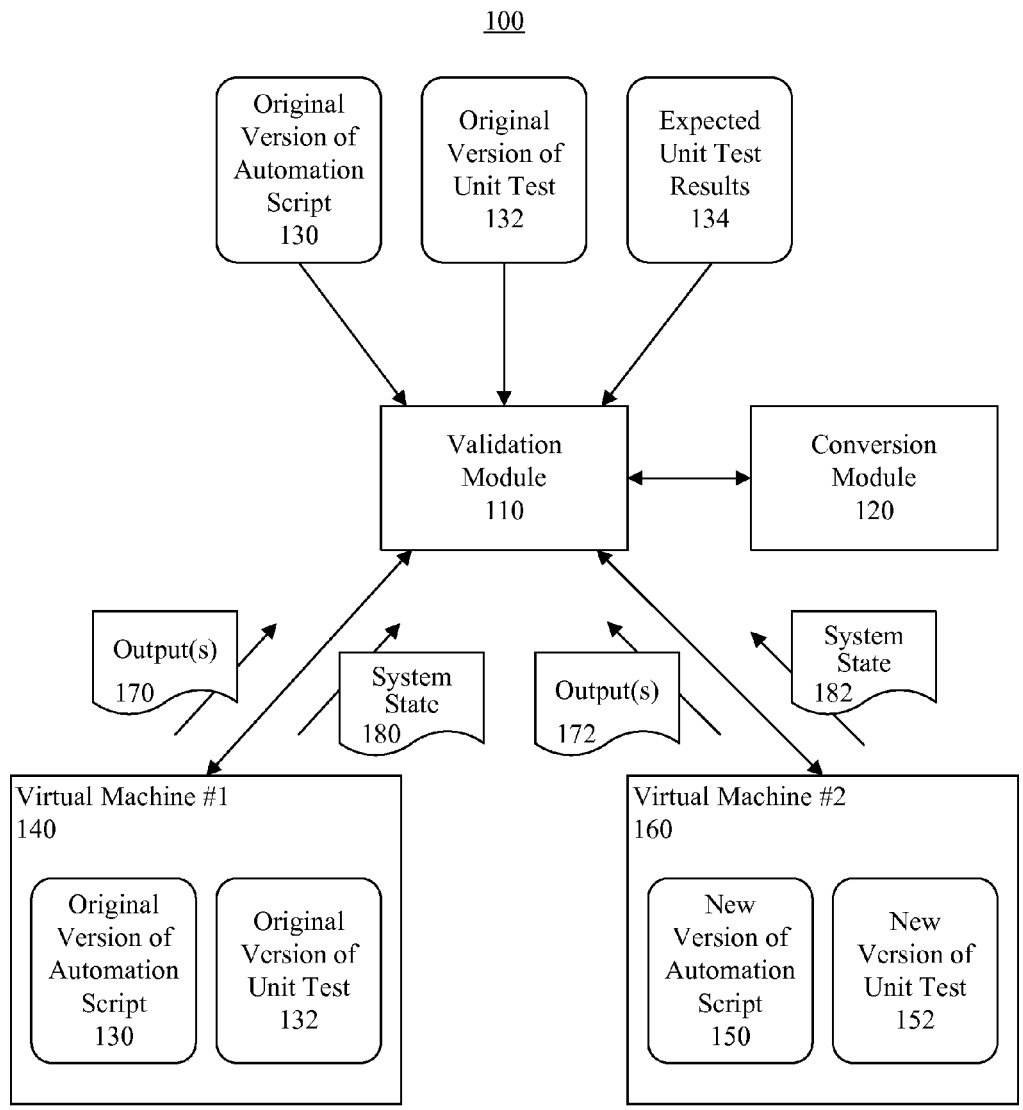
FIG. 1 is a block diagram illustrating an example of a system that adopts an existing automation script to a new framework.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon. Any combination of one or more computer-readable medium(s) may be utilized. The computer-readable medium may be a computer-readable signal medium, a computer-readable storage medium, or a combination thereof.

As defined herein, the term "computer-readable storage medium" means a storage medium that contains or stores program code for use by or in connection with an instruction execution system, apparatus, or device. As defined herein, a "computer-readable storage medium" is not a transitory propagating signal per se. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to adopting an existing automation script to a new framework. Specifically, an automation script, which is configured to execute in a particular framework, can be received. In addition, a unit test designed to exercise the automation script, as well as expected test results, also can be received. The automation script can be processed to generate another version configured to execute in at least one other framework. In addition to generating a new version of the automation script, a new version of the unit test, configured to exercise the new version of the automation script on the other framework(s), also can be generated. The original version of the automation script and the new version both can be executed in parallel on respective virtual machines to run the respective versions of the unit test. If the outputs generated by the respective versions of the automation script correlate to one another, as well as to the expected unit test results, and the system states of the respective virtual machines correlate when or after the unit tests execute, the new versions of the automation script and unit test can be determined to be valid, and output to be made available for deployment.

Advantageously, generating new versions of automation scripts and unit tests from existing automation scripts and unit tests saves much time spent on system administration. Rather than writing new automation scripts and unit tests for new frameworks, existing automation scripts and unit tests can be quickly converted into new versions that properly execute in the other frameworks. Moreover, the new versions of the automation scripts and unit tests can be configured to be platform independent, allowing them not only to be deployed for use in new frameworks, but also for use in the framework for which they were originally developed. Thus, for a particular automation process, a single automation script and unit test can be used to automate such process in any of a variety of platforms that may exist in a cloud network.

Several additional definitions that apply throughout this document will now be presented.

As defined herein, the term "automation script" means software that includes a launch point and source code written in a scripting language configured to automate one or more tasks within a system. For example, automation script can be used to automate installation of an application or service on a system, implement object rules, field validations, workflow or escalation actions, workflow condition logic and security condition logic, etc.

As defined herein, the term "launch point" means a script configuration. The launch point identifies a target application or context, and variables that are passed between the application and the source code. In this regard, the launch point defines the execution context for the source code contained in an automation script.

As defined herein, the term "unit test" means an automated test configured to be run by automation script in order to validate the automation script.

As defined herein, the term "output" means at least one result caused by an automation script to be generated or occur. Such result can be, for example, a configuration of an application or system, a file or other data that is generated, or any other result that an automated script may cause to be generated or occur.

As defined herein, the term "framework" means a reusable software platform to develop applications, products and/or solutions. A framework can include support programs, compilers, code libraries, tool sets and/or application programming interfaces that enable development of a project or solution.

FIG. 1 is a block diagram illustrating an example of a system 100 that adopts an existing automation script to a new framework. The system 100 can include a validation module 110 and a conversion module 120. The validation module 110 can receive an original version of automation script (hereinafter "script") 130, an original version of a unit test (hereinafter "unit test") 132 and expected unit test results (hereinafter "expected results") 134. The script 130 can be configured to execute in a particular framework. By way of example, the script 130 can be a Unix® shell artifact configured to execute in a Unix® framework. The present arrangements are not limited to this specific example, however. Indeed, the script 130 can be configured to execute in frameworks for Windows®, Windows Server®, Linux™, or any other framework.

Initially, the validation module 110 can validate the script 130 to determine whether the script 130 properly functions. In illustration, the validation module 110 can pass the script 130 and unit test 132 to a system, such as a virtual machine 140. The virtual machine 140 can provide the framework in which the script 130 is configured to execute. For example, if the script 130 is a Unix® shell artifact, the virtual machine can host a Unix® operating system. The virtual machine 140 can execute on the same processing system on which the validation module 110 executes, or on another processing system communicatively linked to the processing system on which the validation module 110 executes. At the behest of the validation module 110, the virtual machine 140 can execute the script 130 to run the unit test 132 and generate at least one output. The validation module 110 can compare the output to the expected results 134 to determine whether the output correlates with the expected results 134. If so, the script 130 can be considered to be valid. In this regard, the validation module 110 can interface with the virtual machine 140 in a manner than enables the validation module 110 to access the output generated by the script 130.

If the script 130 is valid, the validation module 110 can pass a copy of the script 130 to the conversion module 120, which can process the script 130 to create a new version of the automation script (hereafter "new script") 150. In illustration, the conversion module 120 can compare application programming interfaces (APIs) of the framework in which the script 130 is configured to execute to APIs of the new framework in which the new script 150 is to be configured to execute in order to identify changes that need to be made to the source code and/or launch point of the script 130 to make the script 130 compatible with the new framework, while retaining its original functionality. These changes can be made to the script 130 (i.e., the copy of the script 130 passed to the conversion module 120) to generate the new script 150.

The conversion module 120 can configure the new script 150 to execute in one or more frameworks, with at least one of these frameworks being different than the framework in which the script 130 is configured to execute. In one example, the new script 150 can be configured as Ruby script. Ruby is a platform independent framework that may operate with any of a number of other frameworks. Moreover, the new script 150 can be encapsulated as a Chef Recipe. Chef is an open-source systems integration framework built specifically for automating processes performed in a cloud network. A Chef Recipe is a Ruby-based automation script configured to execute in the Chef framework. The present arrangements are not limited to this example, however, and the new script 150 can be configured as any other suitable type of automation script. In one aspect, the validation module 110 or the conversion module 120 can prompt a user to specify the type of automation script to be generated, and the conversion module 120 can generate the new script 150 accordingly.

Further, the validation module 110 also can pass a copy of the unit test 132 to the conversion module 120, and the conversion module can process the unit test 132 to create a new version of the unit test (hereinafter "new unit test") 152. The conversion module 120 can configure the new unit test 152 to be run by the new script 150 when the new script 150 is executed in order to validate the new script 150. Continuing with the previous example, the new unit test 152 can be configured as a Cucumber unit test. A Cucumber unit test is a Ruby-based unit test that supports validation using a Ruby unit test framework.

The validation module 110 can receive the new script 150 and new unit test 152, and perform an initial validation on the new script 150 to confirm the new script 150 is executable. For example, the validation module 110 can pass the new script to a system, such as a virtual machine 160, to test the new script 150 to verify that it will indeed execute. If the new script 150 passes such validation, the validation module 110 also can pass the new unit test 152 to the virtual machine 160. The virtual machine 160 can execute on the same processing system on which the validation module 110 executes, or on another processing system communicatively linked to the processing system on which the validation module 110 executes. In one arrangement, the virtual machine 140 and the virtual machine 160 both can execute on the same processing system, though this need not be the case.

The validation module 110 can interface with the virtual machines 140, 160 to initiate execution of the script 130 to run the unit test 132 on the virtual machine 140 and initiate execution of the new script 150 to run the unit test 152 on the virtual machine 160. Moreover, the validation module 110 can initiate such executions so that the script 130 and the new script 150 execute in parallel, line by line. As the script 130 and new script 150 generate respective outputs 170, 172, the validation module 110 can compare the outputs 170, 172 to the expected results 134 to determine whether the outputs 170, 172 correlate with the expected results 134. Further, the validation module 110 can compare the outputs 172 generated by the new script 150 to outputs 170 generated by the script 130 to determine whether these outputs 170, 172 correlate. If the outputs 172 generated by the new script 150 do not correlate with the expected results 134 and/or the outputs 170 generated by the script 130, the new script 150 and/or new unit test 152 can be identified as being invalid. Otherwise, the validation module 110 can determine that the new script 150 and new unit test have passed a portion of the validation process based on proper outputs 172 being generated.

In one aspect, as the scripts 130, 150 execute in parallel, line by line, the validation module 110 can monitor each sequential output 170, 172 generated by each of the scripts 130, 150, identify which outputs 170 generated by the script 130 correspond to outputs 172 generated by the new script 150. Such outputs 170, 172 can be identified as an output pair. Each output 170, 172 in an output pair can be compared to the expected results 134. When at least one of the outputs 170, 172 in an output pair do not correlate with the expected results 134, or the outputs 170, 172 in the output pair do not correlate with one another, the validation module 110 can identify code in the respective scripts 130, 150 that generate the subject outputs 170, 172 in the output pair. Moreover, the validation module 110 can identify portions of the respective unit tests 132, 152 being operated upon by the identified code. Such identification can facilitate debugging of the scripts 130, 150 and/or the unit tests 132, 152. For example, a user can revise the identified code in the new script 150, revise the new unit test 152, revise the process used by the conversion module 120 to generate the new script 150 and/or revise the process used by the conversion module 120 to generate the new unit test 152.

In addition to validating the outputs 170, 172 generated by the scripts 130, 150, the validation module 110 also can compare the states 180, 182 of respective the virtual machines 140, 160 during or after execution of the respective scripts 130, 150. For example, at the behest of the validation module 110, snapshots of the states 180, 182 can be captured and passed to the validation module 110 to determine whether the states 180, 182 contain the same changes made by the respective scripts 130, 150. One example of a tool that can be used to capture the snapshots is VMware® vCenter™ Operations Management Suite. Examples of information indicated in the system states 180, 182 that can be compared include, but are not limited to, new directories that have been created, the state of new software that has been installed, operating system changes, etc. If the states 180, 182 do not correlate, the new script 150 and/or the new unit test 152 can be identified as being invalid. Otherwise, the validation module 110 can determine that the new script 150 and new unit test 152 have passed a portion of the validation process based on a proper system state being identified.

If the new script 150 and new unit test 152 pass the both the portion of the validation process that examines the outputs 172 generated by the new script 150 and the portion of the validation process that examines the system state 182, then the new script 150 and new unit test 152 can be considered valid and output to be made available for deployment. By way of example, a Unix® shell artifact can be converted to a Chef Recipe and a corresponding unit test can be converted to a Cucumber unit test. Because a Chef Recipe and a Cucumber unit test are platform independent, they can be used to not only automate processes performed in a Unix® operating system, but also automate processes performed in other platforms. This greatly increases administration efficiency in cloud networks that incorporate various different software platforms.

FIG. 2 is a flow chart illustrating an example of a method 200 of adopting an existing automation script to a new framework. At step 202, a first version of an automation script configured to execute in a first framework and expected unit test results for the automation script can be received. A first version of a unit test also can be received. At step 204, a second version of the automation script can be created, using a processor, from the first version of the automation script. The second version of the automation script can be configured to execute in at least a second framework. At step 206, a second version of the unit test can be automatically created from the first version of the unit test.

At step 208, the first version of the automation script can be executed in the first framework to run the first version of the unit test and the second version of the automation script can be executed in the second framework to run the second version of the unit test. At step 210, at least a first output generated by the first version of the automation script running the first version of the unit test and at least a second output generated by the second version of the automation script running the second version of the unit test can be compared to at least one expected unit test result to determine whether the first output and the second output correlate with the expected unit test result. At step 212, a first state of a first system hosting the first framework can be captured post execution of the first version of the automation script and a second state of a second system hosting the second framework can be captured post execution of the second version of the automation script. At step 214, the second state of the second system can be compared to the first state of the first system to determine whether the second state correlates with the first state.

At step 216, responsive to the first output and the second output correlating with the expected unit test result and the second state correlating to the first state, a determination can be made that the second version of the automation script is valid. The second version of the automated script and the second version of the unit test can be output for deployment.

Figure 3:
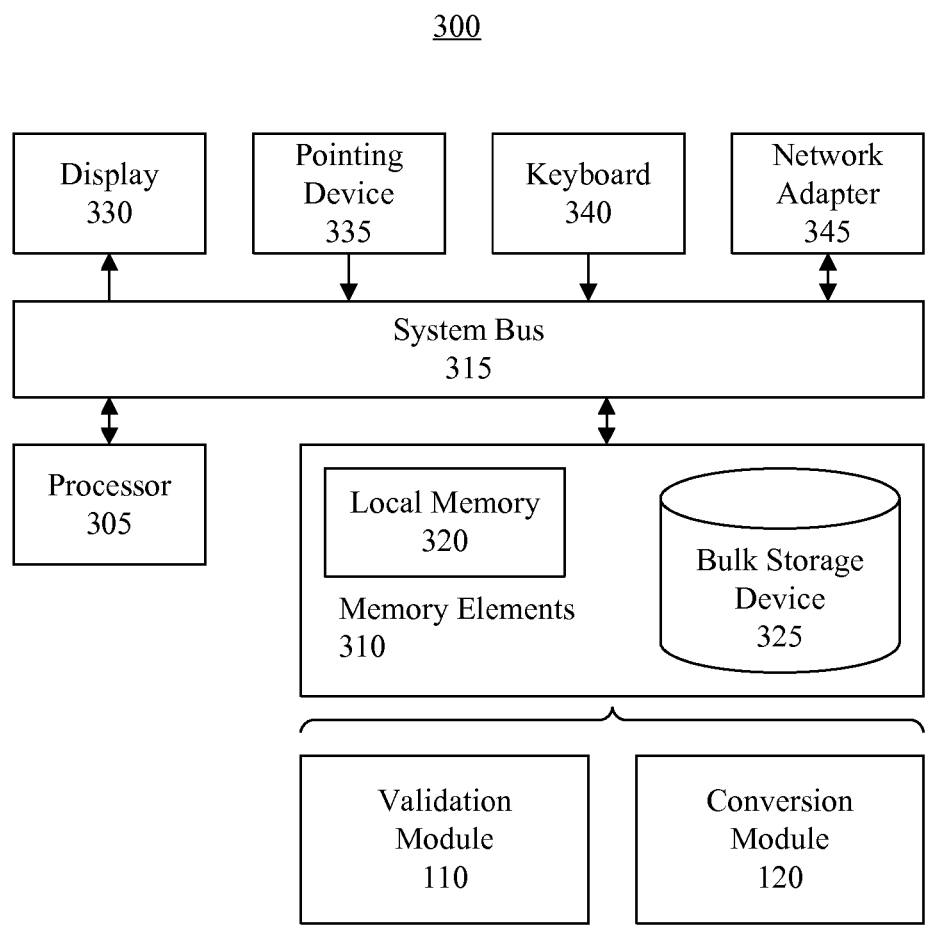
FIG. 3 is a block diagram illustrating an exemplary architecture for a processing system configured to adopt an existing automation script to a new framework.

FIG. 3 is a block diagram illustrating an exemplary architecture for a processing system 300 configured to adopt an existing automation script to a new framework. The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as server, a workstation, a desktop computer, a mobile computer, a laptop computer, a tablet computer, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 optionally can be coupled to the processing system 300. The I/O devices can be coupled to the processing system 300 either directly or through intervening I/O controllers. For example, the display 330 can be coupled to the processing system 300 via a graphics processing unit (GPU), which may be a component of the processor 305 or a discrete device. One or more network adapters 345 also can be coupled to processing system 300 to enable processing system 300 to become coupled to other systems, computer systems, remote printers, and/or remote storage devices through intervening private or public networks. Modems, cable modems, transceivers, and Ethernet cards are examples of different types of network adapters 345 that can be used with processing system 300.

As pictured in FIG. 3, the memory elements 310 can store the components of the system 100 of FIG. 1, namely the validation module 110 and the conversion module 120. Being implemented in the form of executable program code, these components of the system 100 can be executed by the processing system 300 and, as such, can be considered part of the processing system 300. Moreover, the validation module 110 and the conversion module 120 are functional data structures that impart functionality when employed as part of the processing system 300 of FIG. 3.

The memory elements 310 also can store the script 130, the unit test 132 and the expected results 134 of the system of FIG. 1. These also are functional data structures that impart functionality when employed as part of the processing system 300 of FIG. 3.

Further, the memory elements can store one or both of the virtual machines 140, 160 of the system of FIG. 1. These also are functional data structures that impart functionality when employed as part of the processing system 300 of FIG. 3. As noted, the virtual machines 140, 160 may be hosted on other processing systems to which the processing system 300 is communicatively linked via the network adapter 345.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor programmed to initiate executable operations comprising:
receiving a first version of an automation script configured to execute in a first framework and expected unit test results for the automation script;
automatically creating a second version of the automation script from the first version of the automation script, the second version of the automation script configured to execute in at least a second framework;
generating a first plurality of outputs by executing the first version of the automation script in the first framework to run a first version of a unit test and, in parallel with executing the first version of the automation script, generating a second plurality of outputs by executing the second version of the automation script in the second framework to run a second version of the unit test;

comparing each sequential one of the first plurality of outputs generated by the first version of the automation script running the first version of the unit test and a corresponding one of the second plurality of outputs generated by the second version of the automation script running the second version of the unit test, as output pairs, to at least one expected unit test result to determine whether the first output and the second output correlate with the expected unit test result; and responsive at least to one output in a particular output pair not correlating with the expected unit test result, identifying code in the first version of the automation script and code in the second version of the automation script that generate the respective outputs in the output pair.

2. The system of claim 1, the executable operations further comprising:

automatically creating the second version of the unit test from the first version of the unit test.

3. The system of claim 2, the executable operations further comprising:

outputting the second version of the automation script and the second version of the unit test.

4. The system of claim 1, the executable operations further comprising:

capturing a first state of a first system hosting the first framework post execution of the first version of the automation script;

capturing a second state of a second system hosting the second framework post execution of the second version of the automation script; and comparing the second state of the second system to the first state of the first system to determine whether the second state correlates with the first state.

5. The system of claim 1, wherein the second version of the automation script is configured to execute in a plurality of frameworks.

6. A computer program product comprising a computer readable storage medium having program code stored thereon, the program code executable by a processor to perform a method comprising:

receiving, by the processor, a first version of an automation script configured to execute in a first framework and expected unit test results for the automation script;

automatically creating, by the processor, a second version of the automation script from the first version of the automation script, the second version of the automation script configured to execute in at least a second framework;

generating a first plurality of outputs by executing, by the processor, the first version of the automation script in the first framework to run a first version of a unit test and, in parallel with executing the first version of the automation script, generating a second plurality of outputs by executing the second version of the automation script in the second framework to run a second version of the unit test;

comparing, by the processor, each sequential one of the first plurality of outputs generated by the first version of the automation script running the first version of the unit test and a corresponding one of the second plurality of outputs generated by the second version of the automation script running the second version of the unit test, as output pairs, to at least one expected unit test result to determine whether the first output and the second output correlate with the expected unit test result; and responsive at least to one output in a particular output pair not correlating with the expected unit test result, identifying, by the processor, code in the first version of the automation script and code in the second version of the automation script that generate the respective outputs in the output pair.

7. The computer program product of claim 6, the method further comprising:

automatically creating the second version of the unit test from the first version of the unit test.

8. The computer program product of claim 7, the method further comprising:

outputting the second version of the automation script and the second version of the unit test.

9. The computer program product of claim 6, the method further comprising:

capturing a first state of a first system hosting the first framework post execution of the first version of the automation script;

capturing a second state of a second system hosting the second framework post execution of the second version of the automation script; and comparing the second state of the second system to the first state of the first system to determine whether the second state correlates with the first state.

10. The computer program product of claim 6, wherein the second version of the automation script is configured to execute in a plurality of frameworks.

* * * * *